US007030873B2

(12) United States Patent
Matsuda

(10) Patent No.: US 7,030,873 B2
(45) Date of Patent: Apr. 18, 2006

(54) SYSTEM FOR GENERATING PRINTED BOARD THREE-DIMENSIONAL SHAPE DATA

(75) Inventor: Tatsuhiro Matsuda, Yokohama (JP)

(73) Assignee: Zuken Inc., Kangawa (JP)

( * ) Notice: Subject to any disclaimer, the term of this patent is extended or adjusted under 35 U.S.C. 154(b) by 64 days.

(21) Appl. No.: 10/181,626

(22) PCT Filed: Dec. 14, 2000

(86) PCT No.: PCT/JP00/08845

§ 371 (c)(1),
(2), (4) Date: Jul. 18, 2002

(87) PCT Pub. No.: WO01/54000

PCT Pub. Date: Jul. 26, 2001

(65) Prior Publication Data

US 2003/0001839 A1 Jan. 2, 2003

(30) Foreign Application Priority Data

Jan. 21, 2000 (JP) ............................. 2000-013554

(51) Int. Cl.
*G06T 15/00* (2006.01)

(52) U.S. Cl. ...................... 345/419; 345/420; 345/531; 345/532; 345/629

(58) Field of Classification Search ................ 345/419, 345/420, 531, 532, 629
See application file for complete search history.

(56) References Cited

FOREIGN PATENT DOCUMENTS

| | | | |
|---|---|---|---|
| JP | 9-237285 | A | 9/1997 |
| JP | 9-311878 | A | 12/1997 |
| JP | 11-259551 | A | 9/1999 |
| JP | 11-353341 | A | 12/1999 |

*Primary Examiner*—Kimbinh T. Nguyen
(74) *Attorney, Agent, or Firm*—Birch, Stewart, Kolasch & Birch, LLP

(57) ABSTRACT

A system for generating three-dimensional shape data about a high precision printed board without considerable amount of time and efforts. The system comprises a first storage means for storing therein three-dimensional simple shape data about a printed board; a second storage means for storing therein detailed shape data an electronic component; a third storage means for storing therein wiring data; and a generation.

3 Claims, 12 Drawing Sheets

AN EXAMPLE OF WIRING PATTERN SHAPE AND VIA/LAND SHAPE

AN EXAMPLE OF GUI OF IDF PARAMETER

FIG. 4

AN EXAMPLE OF IDF SUBSTRATE FILE

```
.HEADER
BOARD_FILE 2.0 "CR-5000 Board Designer V4.030" 1999/02/04.10:48:20 1
sampleBoard.brd MM
.END_HEADER
.BOARD_OUTLINE
1.400000
0 0.000000 0.000000 0.00000
0 220.000000 0.000000 0.00000
.END_BOARD_OUTLINE
.ROUTE_OUTLINE
0 200.000000 150.000000 0.00000
0 0.000000 150.000000 0.00000
0 0.000000 125.000000 0.00000
.END_ROUTE_OUTLINE
.PLACE_OUTLINE
0 2.000000 95.000000 0.00000
0 0.000000 95.000000 0.00000
0 0.000000 0.000000 0.00000
0 220.000000 0.000000 0.00000
.END_PLACE_OUTLINE
.ROUTE_KEEPOUT
TOP
```

CONTINUED FROM FIG. 4

```
0 101.600000 0.000000 0.00000
0 101.600000 0.000000 0.00000
.END_ROUTE_KEEPOUT
.PLACE_REGION
BOTH ANALOG2
0 166.370000 85.090000 0.00000
0 166.370000 12.700000 0.00000
.END_PLACE_REGION
.DRILLED_HOLES
1.750000 100.000000 145.000000 NPTH BOARD
1.750000 195.000000 145.000000 NPTH BOARD
.END_DRILLED_HOLES
.PLACEMENT
1608Achip_80000 1608Achip_80000 C15
26.670000 107.950000 180.000000 BOTTOM PLACED
1608Achip_80000 1608Achip_80000 C16
8.890000 125.730000 180.000000 BOTTOM PLACED
1608Achip_80000 1608Achip_80000 C17
29.210000 67.310000 90.000000 TOP PLACED
1608Achip_80000 1608Achip_80000 C18
57.150000 27.940000 90.000000 TOP PLACED
1608Achip_80000 1608Achip_80000 C19
78.740000 68.580000 0.000000 BOTTOM PLACED
.END_PLACEMENT
EOF
```

FIG. 5

AN EXAMPLE OF IDF COMPONENT FILE

```
. .HEADER
LIBRARY_FILE 2.0 "CR-5000 Board Designer V4.030" 1999/02/04.10:48:20 1
.END_HEADER
.ELECTRICAL
1608Achip_80000 1608Achip_80000 MM 0.800000
0 -2.000000 0.600000 0.00000
0 -2.000000 -0.600000 0.00000
0 2.000000 -0.600000 0.00000
0 2.000000 0.600000 0.00000
0 -2.000000 0.600000 0.00000
.END_ELECTRICAL
.ELECTRICAL
CRQ3smd_90000 CRQ3smd_90000 MM 0.900000
```

CONTINUED FROM FIG. 5

```
0 -1.800000 -2.000000 0.00000
0 1.800000 -2.000000 0.00000
0 1.800000 0.800000 0.00000
0 0.800000 0.800000 0.00000
0 0.800000 2.000000 0.00000
0 -0.800000 2.000000 0.00000
0 -0.800000 0.800000 0.00000
0 -1.800000 0.800000 0.00000
0 -1.800000 -2.000000 0.00000
.END_ELECTRICAL
.ELECTRICAL
CON10_1600000 CON10_1600000 MM 16.000000
0 -11.000000 5.500000 0.00000
0 -11.000000 -1.500000 0.00000
0 21.000000 -1.500000 0.00000
0 21.000000 5.500000 0.00000
0 -11.000000 5.500000 0.00000
.END_ELECTRICAL
EOF
```

FIG. 6

〈IDF SUBSTRATE FILE〉

| DESCRIPTION INSIDE IDF FILE | | | | |
|---|---|---|---|---|
| SECTION | RECORD | FIELD | CONTENTS | VALUE |
| Header | 1 | 1 | SECTION KEYWORD | .HEADER |
| | 2 | 1 | FIELD TYPE | BOARD_FILE |
| | 2 | 2 | IDF VERSION | 1.0 or 2.0 |
| | 2 | 3 | IDENTIFICATION NAME OF SOURCE SYSTEM | ARBITRARY |
| | 2 | 4 | DATA | Yyyy/mm/dd.hh.ss |
| | 2 | 5 | VERSION NUMBER OF BOARD FILE | ARBITRARY |
| | 3 | 1 | BOARD NAME | ARBITRARY |
| | 3 | 2 | SYSTEM OF UNIT | MM、TNM、THOU |
| | 4 | 1 | SECTION END KEYWORD | .END_HEADER |
| Board Outline | 1 | 1 | SECTION KEYWORD | .BOARD_OUTLINE |
| | 2 | 1 | BOARD THICKNESS | ARBITRARY |
| | 3 | 1 | LOOP LABEL | 0 or 1 |
| | 3 | 2 | X COORDINATE | ARBITRARY |
| | 3 | 3 | Y COORDINATE | ARBITRARY |
| | 3 | 4 | MOUNTING ANGLE | 0<br>DRAW ARC FROM (Xn-1,Yn-1) TO (Xn,Yn) WHEN OTHER THAN 0 |
| | 4 | 1 | SECTION END KEYWORD | .END_BOARD_OUTLINE |
| Other Outline | 1 | 1 | SECTION KEYWORD | .OTHER_OUTLINE |
| | 2 | 1 | OUTLINE IDENTIFICATION NAME | UNIQUE NAME OF OUTLINE |
| | 2 | 2 | EXTRUSION THICKNESS | ARBITRARY |
| | 3 | 1 | LOOP LABEL | 0 or 1 |
| | 3 | 2 | X COORDINATE | ARBITRARY |
| | 3 | 3 | Y COORDINATE | ARBITRARY |
| | 3 | 4 | MOUNTING ANGLE | 0<br>DRAW ARC FROM (Xn-1,Yn-1) TO (Xn,Yn) WHEN OTHER THAN 0 |
| | 4 | 1 | SECTION END KEYWORD | .END_BOARD_OUTLINE |
| Drilled Holes | 1 | 1 | SECTION KEYWORD | .DRILLED_HOLES |
| | 2 | 1 | HOLE DIAMETER | ARBITRARY |
| | 2 | 2 | X COORDINATE OF CENTER | ARBITRARY |
| | 2 | 3 | Y COORDINATE OF CENTER | ARBITRARY |
| | 3 | 1 | SECTION END KEYWORD | .END_DRILLED_HOLES |
| Component Placement | 1 | 1 | SECTION KEYWORD | .PLACEMENT |
| | 2 | 1 | PACKAGE NAME | COMPONENT NAME OF PACKAGE GEOMETRY |
| | 2 | 2 | COMPONENT NUMBER | NUMBER OF COMPONENT |
| | 3 | 1 | X COORDINATE POSITION | ARBITRARY |
| | 3 | 2 | Y COORDINATE POSITION | ARBITRARY |
| | 3 | 3 | ROTATION ANGLE | ARBITRARY |
| | 3 | 4 | BOARD SURFACE | TOP、BOTTOM |
| | 3 | 5 | ARRANGEMENT STATUS | FIXED、UNPLACED、PLACED |
| | 4 | 1 | SECTION END KEYWORD | .END_PLACEMENT |

FIG. 7

⟨IDF COMPONENT FILE⟩

| DESCRIPTION INSIDE IDF FILE | | | | |
|---|---|---|---|---|
| SECTION | RECORD | FIELD | CONTENTS | VALUE |
| Header | 1 | 1 | SECTION KEYWORD | .HEADER |
| | 2 | 1 | FIELD TYPE | LIBRARY_FILE |
| | 2 | 2 | IDF VERSION | 1.0 or 2.0 |
| | 2 | 3 | IDENTIFICATION NAME OF SOURCE SYSTEM | ARBITRARY |
| | 2 | 4 | DATA | Yyyy/mm/dd.hh.ss |
| | 2 | 5 | VERSION NUMBER OF LIBRARY FILE | ARBITRARY |
| | 3 | 1 | SECTION END KEYWORD | .END_HEADER |
| Electrical | 1 | 1 | SECTION KEYWORD | .ELECTRICAL |
| | 2 | 1 | GEOMETRY NAME | ARBITRARY |
| | 2 | 2 | COMPONENT NUMBER | ARBITRARY |
| | 2 | 3 | SYSTEM OF UNIT | MM、TNM、THOU |
| | 2 | 4 | COMPONENT HEIGHT | ARBITRARY |
| | 3 | 1 | LOOP LABEL | 0 or 1 |
| | 3 | 2 | POINT OF X COORDINATE | ARBITRARY |
| | 3 | 3 | POINT OF Y COORDINATE | ARBITRARY |
| | 3 | 4 | MOUNTING ANGLE | 0<br>DRAW ARC FROM (Xn−1,Yn−1) TO (Xn,Yn) WHEN OTHER THAN 0 |
| | 4 | 1 | SECTION END KEYWORD | .END_ELECTRICAL |

AN EXAMPLE OF THREE-DIMENSIONAL SIMPLE SHAPE OF PRINTED BOARD

AN EXAMPLE OF THREE—DIMENSIONAL DETAIL SHAPE OF ELECTRONIC COMPONENT

AN EXAMPLE OF THREE-DIMENSIONAL SHAPE OF PRINTED BOARD

SYSTEM FOR GENERATING PRINTED BOARD THREE-DIMENSIONAL SHAPE DATA

This application is the national phase under 35 U.S.C. § 371 of PCT International Application No. PCT/JP00/08845 which has an International filing date of Dec. 14, 2000, which designated the United States of America.

TECHNICAL FIELD

The present invention relates to a system for creating three-dimensional shape data of a printed board, and more particularly, it relates to a system for creating three-dimensional shape data of a printed board, which is preferable when used for design negotiation performed between electric packaging-design process and device sheathing design process in a three-dimensional product design performed in product development process in an electronic products manufacturing corporation, for example.

BACKGROUND ART

Conventionally, to create the three-dimensional shape data of the printed board, data such as a substrate outline, substrate thickness, electronic component ID, a rectangular electronic component field, an electronic component height, and arrangement information of electronic component has been output from a substrate CAD system on the file format of IDF (Intermediate Data Format), the above-mentioned IDF file output from the concerned substrate CAD system has been input into a three-dimensional CAD system via an interface, and a three-dimensional shape data of the printed board, where an electronic component shape was expressed as a rectangular parallelepiped-like shape, has been created based on the IDF file input in the concerned three-dimensional CAD system.

Specifically, in the three-dimensional shape data of the printed board, which has been created based on the IDF file output from the above-mentioned substrate CAD system, since only data of a rectangular electronic component field (that is, two-dimensional shape showing the base of electronic component) and the electronic component height regarding the electronic component is given, each electronic component shape is expressed in a rectangular parallelepiped-like shape different from life shape, and furthermore, since there is a case where, regarding the base shape of the electronic component as the rectangular electronic component field, a foot pin nose of the concerned electronic component is made to be an end line, there existed a problem that the use of the created three-dimensional shape data of the printed board as simulation data for highly precise fitting check and strength analysis is limited.

On the other hand, in the case of creating the three-dimensional shape data of the highly precise printed board by the above-mentioned conventional technique, there existed a problem that a great amount of time and labor are needed because each designer needed to perform data editing of the three-dimensional shape data of the printed board, which has been obtained by the IDF format, with manual operation.

The present invention is created in view of the above-mentioned problems that the prior art has, and its object is to provide the system for creating the three-dimensional shape data of the printed board, which can create the three-dimensional shape data of the highly precise printed board without needing a great amount of time and labor.

DISCLOSURE OF THE INVENTION

To attain the above-mentioned object, the present invention is one that has: first storage means that stores printed board three-dimensional simple shape data showing a three-dimensional simple shape of a printed board; second storage means that stores electronic component three-dimensional detail shape data showing a three-dimensional detail shape of electronic component; third storage means that stores wiring data showing a wiring pattern shape and via/land shape of the printed board; and generation means that reads out the printed board three-dimensional simple shape data stored in the above-mentioned first storage means, the electronic component three dimensional detail shape data stored in the above-mentioned second storage means, and the wiring data stored in the above-mentioned third storage means, and generates printed board three-dimensional detail shape data showing a three-dimensional detail shape of the printed board, where the wiring pattern shape and the via/land shape that the wiring data shows are synthesized with a three-dimensional shape of the printed board, in which the electronic component shape constituting the three-dimensional simple shape of the printed board that the printed board three-dimensional simple shape data shows is substituted for the electronic component shape that the electronic component three dimensional detail shape data shows.

Herein, the above-mentioned first storage means is equivalent to a 'substrate three dimensional simple shape storage region 104' in the section of 'Best mode for implementing the invention' which is described later, the above-mentioned second storage means is equivalent to a 'component three-dimensional detail shape storage region 106' in the section of 'Best mode for implementing the invention' which is described later, the above-mentioned third storage means is equivalent to a 'wiring pattern shape/via-land shape storage region 100' in the section of 'Best mode for implementing the invention' which is described later, and the above-mentioned generation means is equivalent to 'component three-dimensional shape substitute means 54' in the section of 'Best mode for implementing the invention' which is described later.

Further, the present invention may have read-out means that reads out the electronic component three dimensional detail shape data of electronic component, which the printed board three-dimensional simple shape data stored in the above-mentioned first storage means shows, from an external database for the second storage means.

Herein, the above-mentioned external database is equivalent to a 'component three-dimensional detail shape library 22' in the section of 'Best mode for implementing the invention' which is described later, and the above-mentioned read-out means is equivalent to 'component three-dimensional shape reading means 40' in the section of 'Best mode for implementing the invention' which is described later.

Furthermore, the present invention has processing means that reads out predetermined data from a second external database, generates the printed board three-dimensional simple shape data based on the data read out and stores it in the above-mentioned first storage means, and the above-mentioned read-out means is one that reads out the electronic component three-dimensional detail shape data from the above-mentioned external database according to electronic component that the predetermined data, which the above-mentioned processing means read out, shows.

Herein, the above-mentioned second external database is equivalent to an 'IDF substrate file 16' and an 'IDF component file 18' in the section of 'Best mode for implementing the invention' which is described later, and the above-mentioned read-out means is equivalent to 'IDF file reading means 36' and 'substrate three-dimensional shape creation/synthesis means 52' in the section of 'Best mode for implementing the invention' which is described later.

BRIEF DESCRIPTION OF THE DRAWINGS

FIG. 4 is a data list that shows an example of the IDF substrate file.

FIG. 5 is a data list that shows an example of the IDF component file.

FIG. 6 is a chart that shows the specification of the substrate by the IDF substrate file.

FIG. 7 is a chart that shows the specification of the electronic component by the IDF component file.

EXPLANATION OF REFERENCE NUMERALS

10. Board modeler (Board Modelar)

12. Printed board CAD

14. Substrate CAD file

16. IDF substrate file

18. IDF component file

20. External design database

22. Component three-dimensional detail shape library

Figure 1:
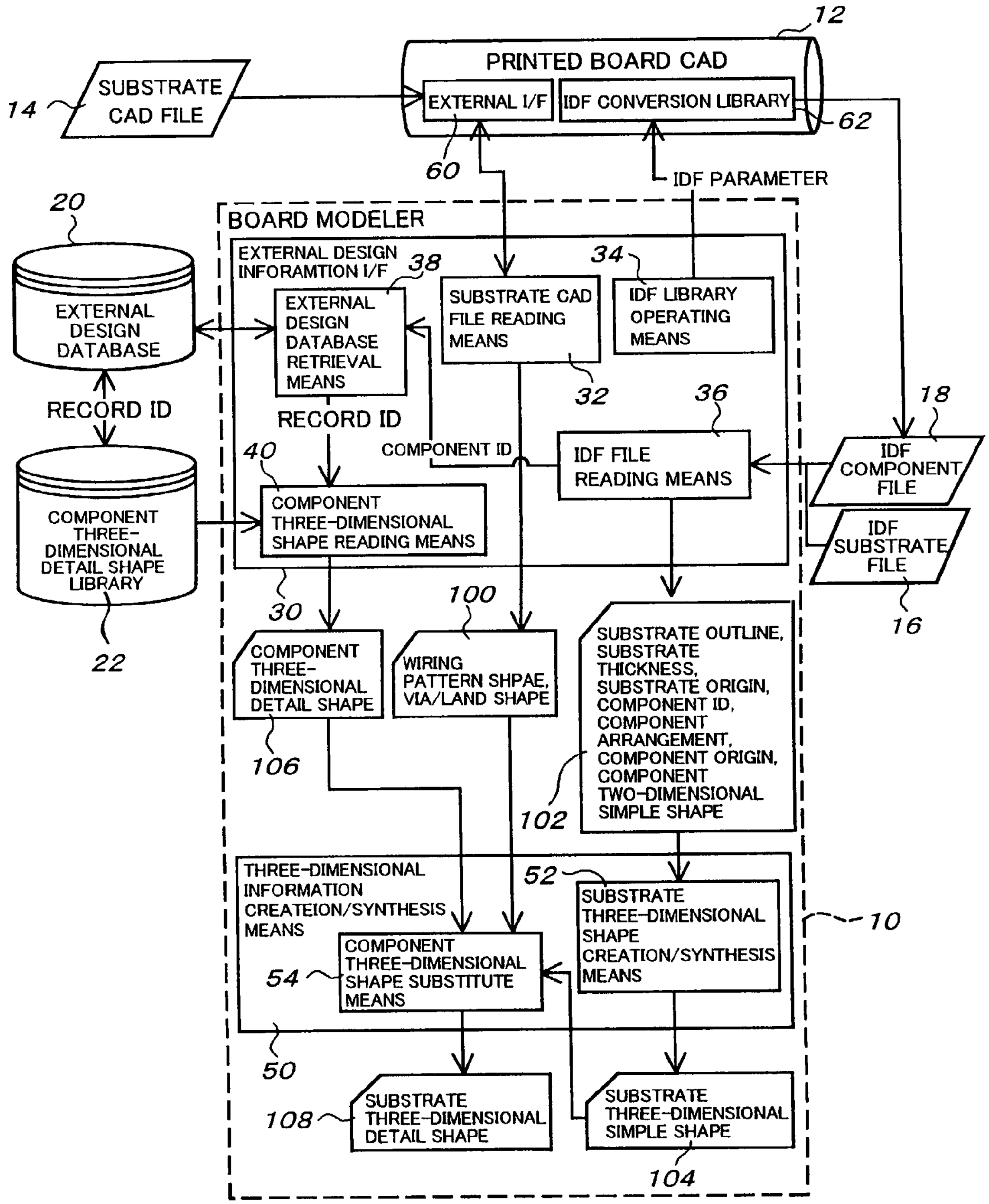
FIG. 1 is a block configuration view that shows an example of an embodiment of the three-dimensional shape data creation system of the printed board according to the present invention.

30. External design information interface (External design information I/F)

32. Substrate CAD file reading means

34. IDF library operating means

36. IDF file reading means

38. External design database retrieval means

40. Component three-dimensional shape reading means

50. Three-dimensional information creation/synthesis means

52. Substrate three-dimensional shape creation/synthesis means

54. Component three-dimensional shape substitute means

60. External interface (External I/F)

62. IDF conversion library

100. Wiring pattern shape/via-land shape storage region

102. Storage region of substrate outline and the like

104. Substrate three-dimensional simple shape storage region

106. Component three-dimensional detail shape storage region

108. Substrate three-dimensional detail shape storage region

BEST MODE FOR IMPLEMENTING THE INVENTION

Hereinafter, an example of the embodiment of the three-dimensional shape data creation system of the printed board according to the present invention will be described with reference to the accompanying drawings.

FIG. 1 shows the block configuration view showing an example of the embodiment of the three-dimensional shape data creation system of the printed board according to the present invention.

This three-dimensional shape data creation system of the printed board (hereinafter, referred to as 'this system') is one where control of operation is realized by a micro computer and its software, which is constituted by having: the board modeler (Board Modelar) 10 that forms a principal portion of the present invention; the printed board CAD 12 connected with the board modeler 10; the substrate CAD file 14 connected with the printed board CAD 12; the IDF substrate file 16 output from the printed board CAD 12 and connected with the board modeler 10; the IDF component file 18 output from the printed board CAD 12 and connected with the board modeler 10; the external design database 20 connected with the board modeler 10; and component three-dimensional detail shape library 22 connected with the board modeler 10.

Herein, the board modeler 10 is constituted by having: the external design information interface (external design information I/F) 30; and the three-dimensional information creation/synthesis means 50.

And, the external design information I/F 30 has: the substrate CAD file reading means 32; the IDF library operating means 34; the IDF file reading means 36; the external design database retrieval means 38; and the component three-dimensional shape reading means 40.

Further, the three-dimensional information creation/synthesis means 50 is constituted by having: the substrate three-dimensional shape creation/synthesis means 53; and the component three-dimensional substitute means 54.

Note that the printed board CAD 12 includes the external interface (external I/F) 60 and the IDF conversion library 62.

In the above-mentioned configuration, in this three-dimensional shape data creation system of the printed board, substance file selection means (not shown) such as file dialog selects an object substrate file first and the full path of the object substrate is obtained by the substrate CAD file reading means 32.

Next, the substrate CAD file reading means 32 is one that passes the full path obtained in the foregoing manner to the external I/F 60 of the printed board CAD 12 as a parameter, and accesses the substrate CAD file 14 using the function of external operation command (ASCII I/F, OLE communication or the like, for example) of the printed board CAD 12.

And, the substrate CAD file reading means 32, using the function of the external operation command similarly to the above-mentioned processing, obtains the two kinds of two-dimensional shape data of the wiring pattern shape and the via/land shape as the wiring data from the substrate CAD file 14 accessed, and stores them to the wiring pattern shape/via-land shape storage region 100 that consists of a random access memory (RAM).

Figure 2:
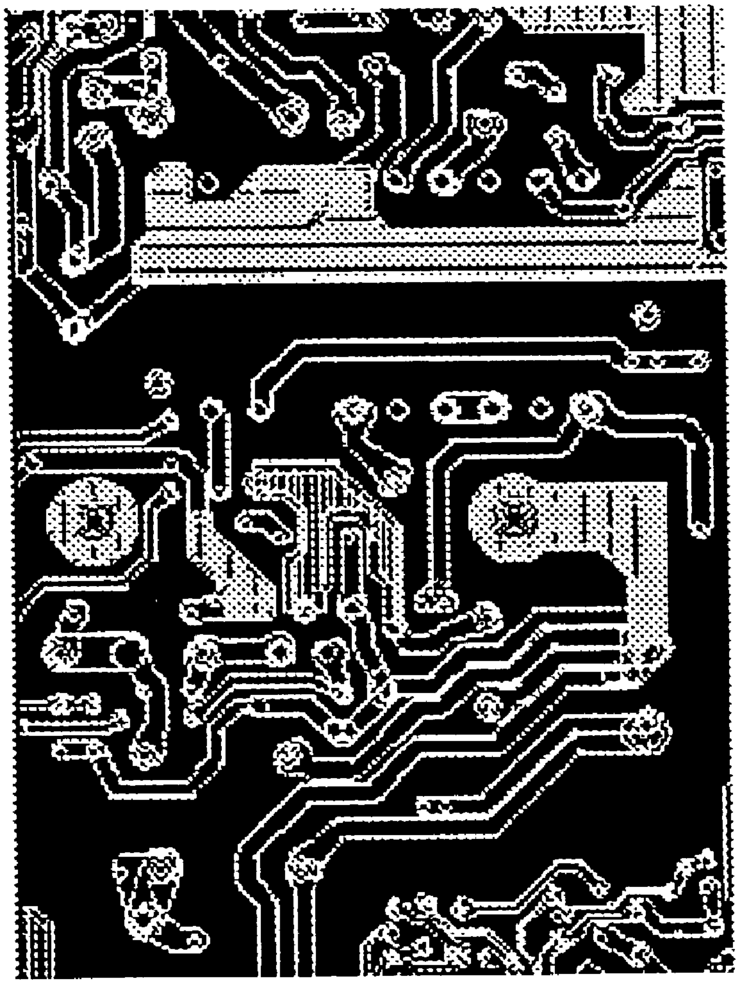
FIG. 2 is an explanatory view that shows an example of the wiring pattern shape and the via/land shape.
Figure 3:
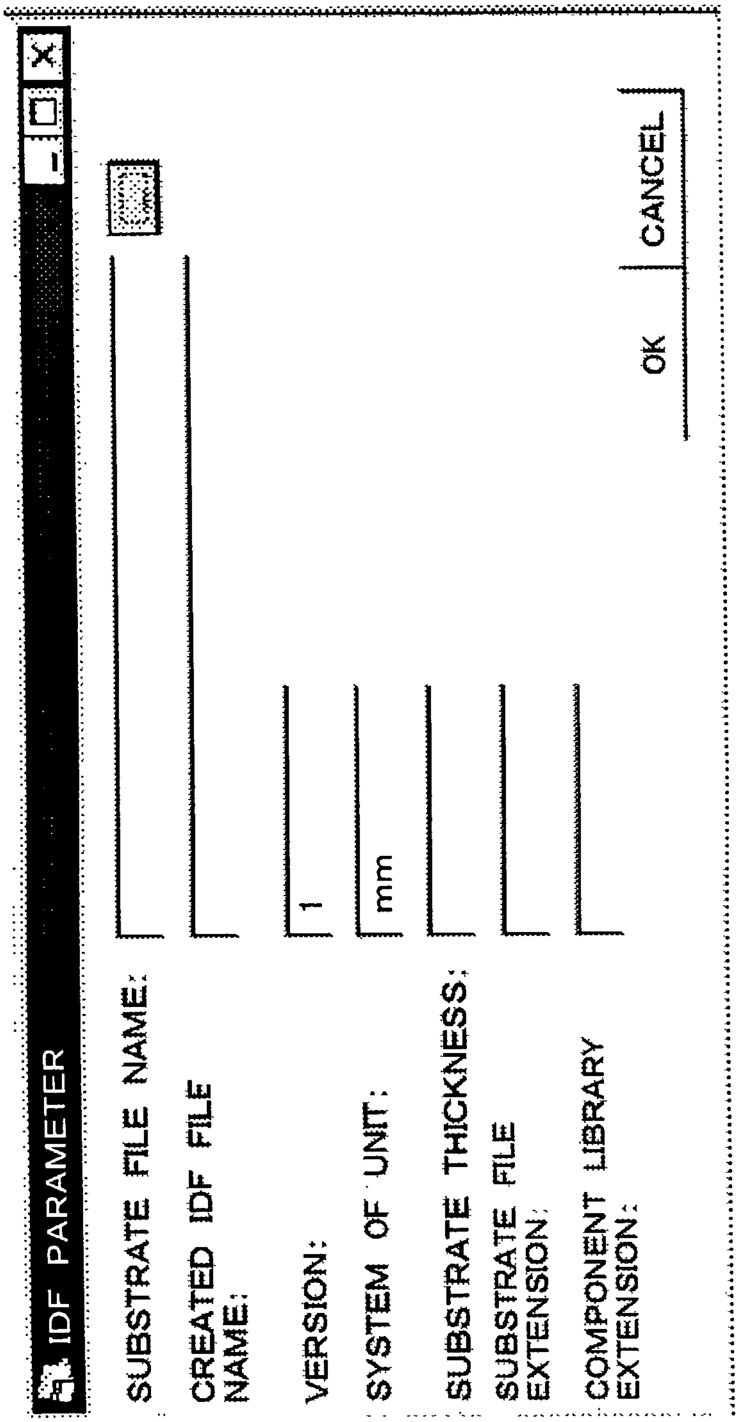
FIG. 3 is an explanatory view that shows an example of a user graphic interface (GUI) of an IDF parameter.

Note that FIG. 2 shows an example of the wiring pattern shape and the via/land shape.

Next, as mentioned above, the substance file selection means (not shown) such as the file dialog selects the object substrate file first and the full path of the object substrate is obtained by the substrate CAD file reading means 32, the full path obtained is passed to the external I/F 60 of the printed board CAD 12 as a parameter, the IDF library operating means 34 enters an IDF parameter where entry is urged according to the user graphic interface (GUI) using the function of external operation command (ASCII I/F, OLE communication or the like, for example) of the printed board CAD 12 in the state where the substrate CAD file 14 is accessed, and the IDF conversion library of the printed board CAD 12 is activated.

Herein, as the IDF parameter where entry is urged according to GUI, a ‘substrate file name’, a ‘created IDF file name’, a ‘version’, a ‘system of unit’, a ‘substrate thickness’, a ‘substrate file extension’, and a ‘component library extension’ are set.

And, in the IDF conversion library 62 of the printed board CAD 12, the printed board CAD 12 obtains a ‘substrate outline’, a ‘substrate origin’, a ‘component ID’, a ‘component arrangement’, and a ‘component origin’ from the substrate CAD file 14 being accessed, and it further creates the IDF substrate file 16 regarding the substrate and the IDF component file 18 for component based on the IDF parameter entered and outputs them to a predetermined bus.

Herein, FIG. 4 shows an example of the IDF substrate file 16, and FIG. 5 shows an example of the IDF component file 18.

Next, the IDF file reading means 36 obtains the value of each element of the ‘substrate outline’, the ‘substrate thickness’ and the ‘substrate origin’ based on the specification shown in the chart of FIG. 6 for example, from the IDF substrate file 16, which has been created as mentioned above and output to the predetermined bus, obtains the value of each element of the ‘component ID’, the ‘component arrangement’, the ‘component, origin’, and a ‘component two-dimensional simple shape’ based on the specification shown in the chart of FIG. 7 for example, from the IDF component file 18, which has been created as mentioned above and output to the predetermined bus, and stores the values obtained in the storage region of substrate outline and the like 102.

Figure 8:
FIG. 8 is an explanatory view that shows an example of the three-dimensional simple shape of the printed board.

Then, the substrate three-dimensional shape creation/synthesis means 52, based on the values stored in the storage region of substrate outline and the like 102, creates and synthesizes the printed board three-dimensional simple shape data showing the three-dimensional simple shape of the printed board as shown in FIG. 8 for example, in which the electronic component shape is expressed as the rectangular parallelepiped-like shape.

Note that the printed board three-dimensional simple shape data created and synthesized by the substrate three-dimensional shape creation/synthesis means 52 is stored in the substrate three-dimensional simple shape storage region 104.

Incidentally, the external design database retrieval means 38 uses the component ID obtained by the IDF file reading means 36 as a key, and if the external design database 20 is an RDB mode, it obtains its corresponding record ID.

And, in the block configuration view shown in FIG. 1, the external design database 20 is the RDB mode, and the case is shown where the external design database retrieval means 38 obtains the record ID.

Note that, if the external design database 20 is a substance file management mode such as a file server, the external design database retrieval means 38 obtains a corresponding full path.

Figure 9:
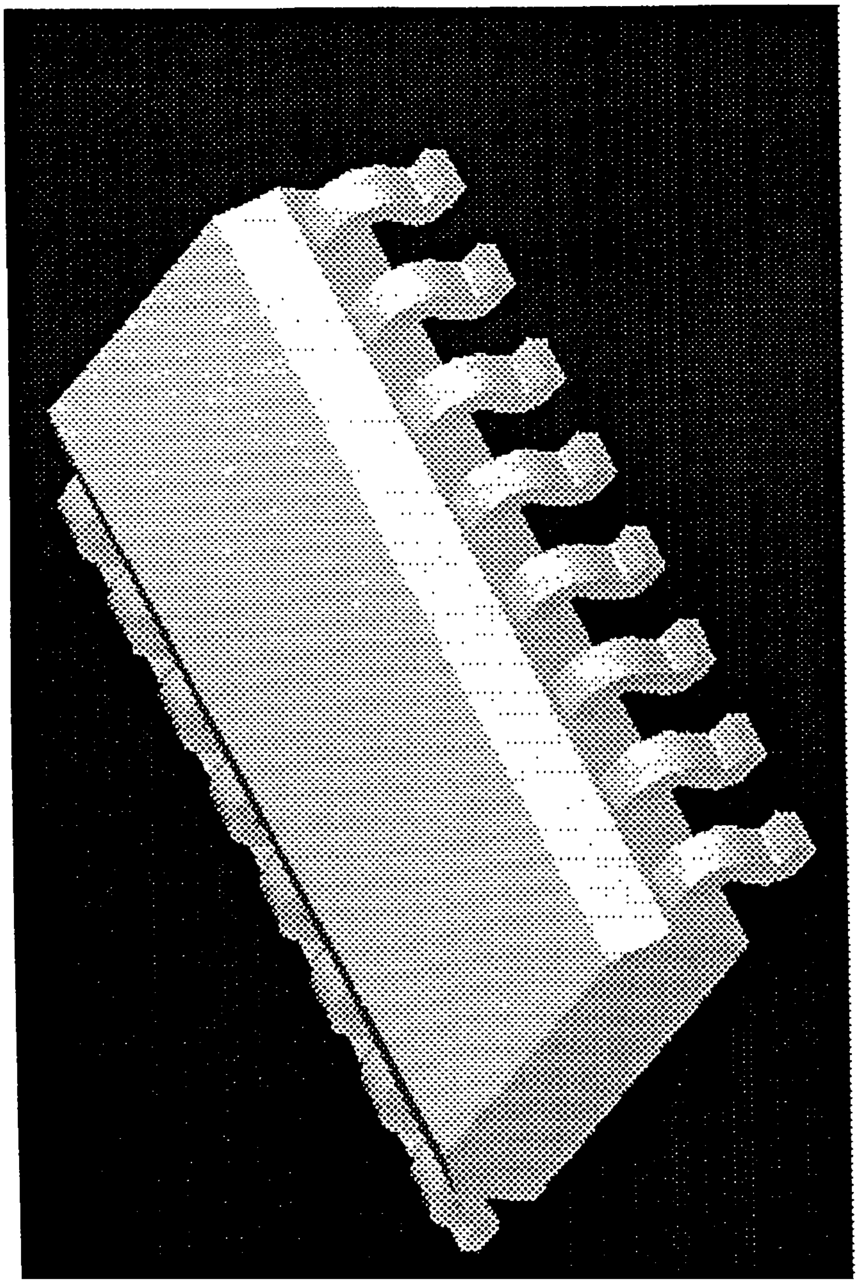
FIG. 9 is an explanatory view that shows an example of the three-dimensional detail shape of electronic component.

Consequently, the component three-dimensional shape reading means 40 reads the electronic component three-dimensional detail shape data showing the three-dimensional detail shape of the electronic component as shown in FIG. 9 for example, where the electronic component shape is expressed as a life shape, from the component three-dimensional detail shape library 22 which is related with the record ID obtained by the external design database retrieval means 38, and stores the electronic component three-dimensional detail shape data read in the component three-dimensional detail shape storage region 106.

Figure 10:
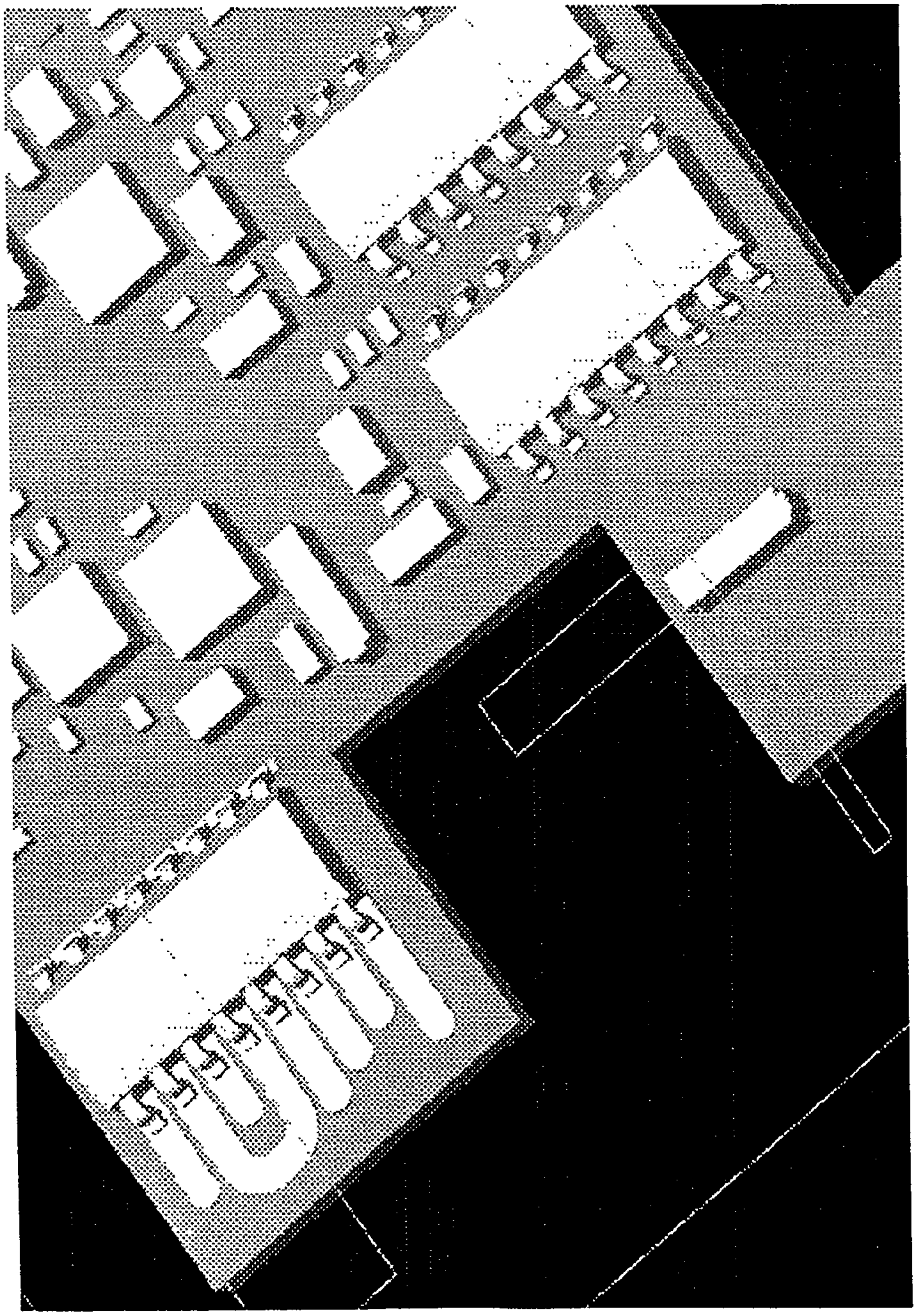
FIG. 10 is an explanatory view that shows an example of the three-dimensional shape of the printed board.

Then, the component three-dimensional shape substitute means 54 reads the electronic component three-dimensional detail shape data stored in the component three-dimensional detail shape storage region 106 based on the arrangement information of each electronic component that the printed board three-dimensional simple shape data stored in the substrate three-dimensional simple shape storage region 104 shows, and synthesizes the detail shape of electronic component using the concerned electronic component three-dimensional detail shape data, substitutes the simple shape of electronic component for the detail shape of the concerned electronic component substituted, and creates the three-dimensional shape of the printed board as shown in FIG. 10, for example.

Moreover, it is one that, regarding the wiring pattern shape and the via/land shape stored in the wiring pattern shape/via-land shape storage region 100, inputs thickness information of the wiring pattern to the wiring pattern shape and inputs thickness information of the substrate to the via/land shape, creates the wiring pattern shape and the via/land shape as three-dimensional shape information, resynthesizes the substrate origin as arrangement information with the above-mentioned printed board three-dimensional detail shape, and completes the three-dimensional detail shape of the printed board.

Then, the printed board three-dimensional detail shape data showing the three-dimensional detail shape of the printed board, which has been created as mentioned above by the component three-dimensional shape substitute means 54, is stored in a substrate three-dimensional detail shape storage region 108.

Therefore, since the printed board three-dimensional detail shape data stored in the substrate three-dimensional detail shape storage region 108 is one that expresses the three-dimensional shape of the printed board in detail, it can be fully used as simulation data such as highly precise fitting check and strength analysis.

Further, according to this system, since each designer does not need to perform data editing of the three-dimensional data of the printed board obtained by the IDF format with manual operation, labor can be significantly reduced and the processing time can be sharply shortened.

Note that the above-mentioned embodiments may be modified into (1) to (3) shown below.

(1) In the above-mentioned embodiments, although description has been made for the case where the IDF format was used as data format, it is not limited to this, of course, and any format can be used as the data format.

(2) In the above-mentioned embodiments, although the printed board three-dimensional simple shape data has been created in this system, it is not limited to this, of course, and an interface function that can enter the printed board three-dimensional simple shape data created in an external system is provided, and the printed board three-dimensional detail shape data may be created using the printed board three-dimensional simple shape data created in the external system.

(3) The above-mentioned embodiments and modification examples shown in the above-mentioned (1) to (2) may be appropriately combined.

INDUSTRIAL APPLICABILITY

Since the present invention is constituted as descried above, it exerts excellent effects that the three-dimensional shape data of the highly precise printed board can be created without needing a great amount of time and labor.

What is claimed is:

1. A system for creating three-dimensional shape data of a printed board, comprising:

first storage means storing printed board three-dimensional simple shape data, each of the printed board three-dimensional simple shape data showing a three-dimensional simple shape of the printed board;

second storage means storing electronic component three-dimensional detail shape data, each of the electronic component three-dimensional detail shape data showing a detailed perspective view of a three-dimensional detail shape of the electronic component;

third storage means storing wiring data, the wiring data showing a two-dimensional wiring pattern shape and a two-dimensional via/land shape of the printed board; and generation means reading out the printed board three-dimensional simple shape data stored in said first storage means, the electronic component three dimensional detail shape data stored in said second storage means, and the wiring data stored in said third storage means, said generation means generating printed board three-dimensional detail shape data showing a three-dimensional detail shape of the printed board, where the two-dimensional wiring pattern shape and the two-dimensional via/land shape are three-dimensionalized by the generation means, the three-dimensionalized wiring pattern shape and the three-dimensionalized via/land shape being synthesized with a three-dimensional shape of the printed board, in which the electronic component shape constituting the three-dimensional simple shape of the printed board that the printed board three-dimensional simple shape data shows is replaced by the electronic component shape that the electronic component three dimensional detail data shows.

2. The system for creating three-dimensional shape data of a printed board according to said claim 1, further comprising:

read-out means that reads out the electronic component three dimensional detail shape data of electronic component, which the printed board three-dimensional simple shape data stored in said first storage means shows, from an external database for the second storage means.

3. The system for creating three-dimensional shape data of a printed board according to claim 2, further comprising:

processing means that reads out predetermined data from a second external database, generates the printed board three-dimensional simple shape data based on the data read out, and stores in said first storage means, wherein said read-out means is one that reads out the electronic component three-dimensional detail shape data from said external database in accordance with the electronic component that the predetermined data, which said processing means has read out, shows.

* * * * *